United States Patent
Haas et al.

(10) Patent No.: US 10,559,895 B2
(45) Date of Patent: Feb. 11, 2020

(54) CONNECTION ADAPTER FOR CONNECTING AN EARTHING LINE TO A METAL PROTECTIVE HOSE

(71) Applicant: Wieland Electric GmbH, Bamberg (DE)

(72) Inventors: Edwin Haas, Hausen (DE); Dharmesh Patel, Brampton (CA); Noaman Makki, Kleinburg (CA); Steven Hughes, Cambridge (CA)

(73) Assignee: Wieland Electric GmbH, Bamberg (DE)

( * ) Notice: Subject to any disclaimer, the term of this patent is extended or adjusted under 35 U.S.C. 154(b) by 25 days.

(21) Appl. No.: 15/593,759

(22) Filed: May 12, 2017

(65) Prior Publication Data

US 2018/0269597 A1    Sep. 20, 2018

(30) Foreign Application Priority Data

Mar. 15, 2017 (DE) .................... 20 2017 101 492 U

(51) Int. Cl.
    *H01R 4/18*    (2006.01)
    *H02G 15/076*  (2006.01)
    *H02G 3/04*    (2006.01)

(52) U.S. Cl.
    CPC ............. *H01R 4/18* (2013.01); *H02G 3/0406* (2013.01); *H02G 3/0468* (2013.01); *H02G 15/076* (2013.01)

(58) Field of Classification Search
    None
    See application file for complete search history.

(56) References Cited

U.S. PATENT DOCUMENTS

| | | | | |
|---|---|---|---|---|
| 3,120,966 A | * | 2/1964 | Lyon .................. | F16L 19/0243 174/89 |
| 3,366,356 A | * | 1/1968 | Fisher ...................... | F16B 9/02 16/2.1 |
| 3,383,457 A | * | 5/1968 | Schumacher .......... | H01R 4/185 174/261 |
| 3,576,937 A | * | 5/1971 | Eldridge, Jr. ............ | H01R 4/70 174/72 R |
| 3,627,904 A | * | 12/1971 | Milne .................. | H02G 3/0683 174/660 |
| 3,787,797 A | * | 1/1974 | Kurz ...................... | H01R 4/646 174/78 |

(Continued)

FOREIGN PATENT DOCUMENTS

| | | |
|---|---|---|
| DE | 2538485 A1 | 3/1977 |
| DE | 2713247 A1 | 9/1978 |
| DE | 202004005259 U1 | 6/2004 |

OTHER PUBLICATIONS

Combined Search and Examination Report under Sections 17 and 18(3) for United Kingdom Patent Application No. GB1800189.1, dated Jul. 5, 2018, 7 pages.

*Primary Examiner* — Timothy J Thompson
*Assistant Examiner* — Muhammed Azam
(74) *Attorney, Agent, or Firm* — Withrow & Terranova, PLLC

(57) ABSTRACT

Connection adapter for connecting an earthing line to a metal protective hose comprising a line contact having at least one ring segment resting on the outer sheath of the earthing line and comprising a hose contact having a contact tab resting on the inner sheath of the protective hose.

10 Claims, 4 Drawing Sheets

(56) References Cited

U.S. PATENT DOCUMENTS

| | | | | |
|---|---|---|---|---|
| 3,814,467 A * | 6/1974 | Van Buren, Jr. | H02G 3/06 | 174/663 |
| 3,848,839 A * | 11/1974 | Tillman | F16L 3/04 | 248/62 |
| 3,858,151 A * | 12/1974 | Paskert | H01R 4/64 | 174/51 |
| 4,009,896 A * | 3/1977 | Brewer | F16B 21/16 | 285/305 |
| 4,012,578 A * | 3/1977 | Moran | H02G 3/0616 | 174/51 |
| 4,106,832 A * | 8/1978 | Burns | H01R 4/64 | 439/100 |
| 4,257,658 A * | 3/1981 | Hammond | H01R 4/646 | 174/78 |
| 4,298,415 A * | 11/1981 | Nolf | B29C 61/0641 | 156/85 |
| 4,400,579 A * | 8/1983 | Nolf | B29C 61/0641 | 156/85 |
| 4,422,890 A * | 12/1983 | Penneck | B29C 61/06 | 138/103 |
| 4,535,196 A * | 8/1985 | Milne | H02G 3/0683 | 16/2.1 |
| 4,558,174 A * | 12/1985 | Massey | G02B 6/4447 | 174/78 |
| 4,692,561 A * | 9/1987 | Nattel | H02G 15/013 | 174/653 |
| 4,880,387 A * | 11/1989 | Stikeleather | H01R 4/64 | 174/653 |
| 4,975,058 A * | 12/1990 | Woodward | A61B 1/24 | 433/126 |
| 5,122,401 A * | 6/1992 | Finkelstein | B29C 63/18 | 138/128 |
| 5,145,370 A * | 9/1992 | Woodward | A61B 1/24 | 433/126 |
| 5,164,545 A * | 11/1992 | Kreinberg | H01R 4/26 | 174/78 |
| 5,269,710 A * | 12/1993 | Donnerstag | H01H 71/08 | 439/810 |
| 5,410,104 A * | 4/1995 | Gretz | H01R 13/59 | 174/653 |
| 5,432,301 A * | 7/1995 | Gehring | D04C 1/06 | 174/74 R |
| 5,610,369 A * | 3/1997 | Foss | H02G 15/013 | 174/84 R |
| 5,625,167 A * | 4/1997 | Van Noten | H02G 15/043 | 174/138 F |
| 5,962,812 A * | 10/1999 | Miyazaki | H01R 9/0524 | 174/78 |
| 5,967,194 A * | 10/1999 | Martin | B60R 16/0215 | 138/110 |
| 6,164,338 A * | 12/2000 | Holzer | F16L 3/26 | 138/106 |
| 6,329,601 B1 * | 12/2001 | Bulford | H02G 15/013 | 174/91 |
| 6,376,777 B1 * | 4/2002 | Ito | H02G 3/0468 | 16/2.1 |
| 6,491,067 B1 * | 12/2002 | Davenport | F16L 7/00 | 138/110 |
| 6,666,415 B2 * | 12/2003 | Hansen | F16B 2/06 | 248/74.1 |
| 6,846,988 B2 * | 1/2005 | Khemakhem | H01R 9/032 | 174/652 |
| 7,065,875 B2 * | 6/2006 | Cai | B60G 21/0551 | 219/156 |
| 7,151,223 B2 * | 12/2006 | Auray | H01R 4/646 | 174/70 R |
| 7,154,042 B2 * | 12/2006 | Auray | H01R 4/646 | 174/70 R |
| 7,205,489 B2 * | 4/2007 | Auray | H01R 4/646 | 174/650 |
| 7,476,817 B1 * | 1/2009 | Shemtov | H01R 13/5816 | 174/661 |
| 7,488,905 B2 * | 2/2009 | Kiely | H01R 13/745 | 174/650 |
| 7,723,623 B2 * | 5/2010 | Kiely | F16L 5/00 | 174/650 |
| 7,906,726 B1 * | 3/2011 | Burkett | H02G 3/0418 | 174/68.1 |
| 7,952,034 B2 * | 5/2011 | Kiely | H02G 3/0683 | 174/650 |
| 8,101,874 B2 * | 1/2012 | Yang | H02G 3/088 | 166/297 |
| 8,350,163 B2 * | 1/2013 | Auray | H02G 3/0691 | 174/650 |
| 8,505,858 B2 * | 8/2013 | Hansen | F16B 2/06 | 174/492 |
| 8,764,485 B2 * | 7/2014 | Hohner | H01R 9/0527 | 439/607.42 |
| 9,196,976 B2 * | 11/2015 | De France | H01R 9/0512 | |
| 9,407,078 B2 * | 8/2016 | Budagher | H02G 3/32 | |
| 9,966,708 B1 * | 5/2018 | Gretz | H01R 4/64 | |
| 10,374,371 B2 * | 8/2019 | Gretz | H01R 13/655 | |
| 2001/0011600 A1 * | 8/2001 | Daume | H01R 4/646 | 174/78 |
| 2002/0034898 A1 * | 3/2002 | Kuwayama | H01R 4/185 | 439/877 |
| 2003/0089517 A1 * | 5/2003 | Takahashi | H01R 9/0518 | 174/78 |
| 2004/0177988 A1 * | 9/2004 | Kiely | H02G 3/0691 | 174/656 |
| 2005/0056442 A1 * | 3/2005 | Santanda | H02G 3/0468 | 174/481 |
| 2005/0269122 A1 * | 12/2005 | Pyron | H02G 3/0691 | 174/666 |
| 2007/0047895 A1 * | 3/2007 | Parikh | G02B 6/4442 | 385/135 |
| 2009/0014198 A1 * | 1/2009 | Shimizu | H02G 3/0468 | 174/102 R |
| 2009/0250235 A1 * | 10/2009 | Gladd | H01R 13/5205 | 174/34 |
| 2010/0212956 A1 * | 8/2010 | Parsons | H01R 4/70 | 174/659 |
| 2011/0083324 A1 * | 4/2011 | Martauz | H01R 4/185 | 29/863 |
| 2012/0111596 A1 * | 5/2012 | Mortun | H01R 13/447 | 174/50.5 |
| 2013/0072041 A1 * | 3/2013 | Nonen | H01R 9/035 | 439/98 |
| 2013/0077928 A1 * | 3/2013 | Hsing | H01R 4/72 | 385/135 |
| 2013/0327569 A1 * | 12/2013 | Stathis | H02G 3/0406 | 174/650 |
| 2014/0000954 A1 * | 1/2014 | Furukawa | H01R 4/188 | 174/359 |
| 2014/0224945 A1 * | 8/2014 | Okuhara | H02G 3/30 | 248/74.1 |
| 2015/0122544 A1 * | 5/2015 | Shiba | H01R 4/70 | 174/72 A |
| 2016/0129464 A1 * | 5/2016 | Frommer | B05B 12/008 | 700/282 |
| 2017/0141489 A1 * | 5/2017 | Hadjiharalambous | H01R 4/66 | |

* cited by examiner

CONNECTION ADAPTER FOR CONNECTING AN EARTHING LINE TO A METAL PROTECTIVE HOSE

RELATED APPLICATION

This application claims the benefit of and priority to German Patent Application No. 20 2017 101 492.4, filed on Mar. 15, 2017, entitled "ANSCHLUSSADAPTER," the disclosure of which is hereby incorporated herein by reference in its entirety.

TECHNICAL FIELD

The invention relates to a connection adapter for an earthing line on a metal protective hose.

BACKGROUND

Metal protective hoses of this type are also referred to as conduits in installation technology. These metal protective hoses or conduits, because of corresponding standards, are used in Anglo-Saxon and Asiatic countries, especially in Great Britain, North America and Canada. These conduits can be designed both as metal tubes and as plastics material tubes or metal hoses or plastics material hoses. A metal hose designed in the manner of a corrugated tube is used particularly frequently as a conduit. A metal profile is often coiled to form a hose, such that the finished metal hose has a coiled thread-like outer sheath. Electrical lines, for example for installation in buildings, are introduced into the metal hoses or conduits. These electrical lines then lie well protected in the conduits and are laid in the cable ducts of buildings. The earthing of the conduit with its electrical lines then also takes place by means of the cable ducts.

A protective hose of this type is known, for example, from the European patent stemming from the applicant having the publication number EP 2 499 705 and the title "ELECTRICAL PLUG CONNECTOR". In this case, the metal protective hose is connected indirectly to the earthing line. Disclosed therein are, specifically, a comb-like and a fork-like earthing contact, which rest with the comb prongs or fork prongs on the metal hose and, at the end thereof remote from the metal hose, in each case have a contact lug, which can be contacted with the aid of a cable shoe or the like. The earthing contact is, so to speak, interposed between the metal hose and the actual earthing line.

A further solution also stems from the applicant and is the subject of the German utility model having the reference number 20 2015 106 155.2 and the title "FASTENING DEVICE". This solution is based on the basic idea of directly contacting the outer sheath of the protective hose. For this, the end of the earthing line is designed as an earthing contact. In this case, the end of the earthing line is connected, preferably screwed, by means of a contact part to the outer sheath of the corrugated tube.

SUMMARY

The object of the present invention is to structurally further simplify the earthing contact.

The feature combination of claim 1 is proposed to achieve this object. The dependent claims contain developments of this invention which are in part advantageous and in part inventive per se.

The invention is based on the basic consideration of providing a connection adapter comprising a line contact which is connected to the earthing line and comprising a hose contact which is connected to the protective hose. The line contact, for connection to the earthing line, has at least one ring segment, which rests on the outer sheath of the earthing line. The hose contact in turn has a contact tab, which in turn rests on the inner sheath of the protective hose. The line contact and the hose contact are connected to one another in terms of the line such that the protective hose is earthed with the aid of the connection adapter by means of the earthing line.

In a preferred embodiment, the line contact and the hose contact are designed in one piece.

In a further preferred embodiment, the ring segment of the line contact resting on the earthing line is completed to form a closed ring. The closed ring of the line contact thus surrounds the entire outer sheath of the earthing line and therefore rests peripherally on the earthing line.

In a further advantageous configuration, provided on the line contact is a ring sleeve, through which the earthing line is inserted. The ring sleeve is preferably designed as a crimped sleeve, such that the earthing line can firstly be pushed without problems through the sleeve and the sleeve is then pressed, therefore ensuring that the inner sheath of the ring sleeve rests in a friction-locking manner on the outer sheath of the earthing line. The earthing line is therefore guided well in the line contact and firmly fixed, which facilitates the assembly of the earthing line on the line contact and increases the safety of use of the line contact.

In a further advantageous configuration, a flange-like disc acts, as it were, as the carrier of the ring sleeve and the contact tab. The flange-like disc is pierced by a line bore aligning with the ring sleeve. The ring sleeve is arranged on the one disc face in continuation of the line bore. The contact tab is arranged on the counter-face remote from the disc face. In an advantageous configuration, the ring sleeve and the contact tab in each case protrude, remote from one another, perpendicularly out of the relevant face of the flange-like disc.

To improve the electrical contact with the protective hose, in a preferred configuration, a plurality of contact tabs arranged next to one another on a circular line are provided. In order to adapt the connection adapter with the aid of a force fit in the protective hose, the diameter of the circular line formed by the contact tabs arranged next to one another is slightly larger than the internal diameter of the protective hose. To shield the lines in the protective hose, an insulating sheath surrounding the lines is provided. The contact tab or the contact tabs are then inserted for fixing between the outer sheath of the insulating sheath and the inner sheath of the protective hose.

To further improve the fit of the connection adapter in the protective hose, the contact tabs are designed as bending rod springs in an advantageous configuration. In the final assembled state, the connection adapter according to the invention, under the centrifugal spring pressure of the contact tabs, then advantageously lies with its contact tabs between the insulating sheath and the protective sheath in the protective hose and is crimped with the earthing line by means of the ring sleeve.

BRIEF DESCRIPTION OF THE DRAWINGS

The invention will be described in further detail with reference to the embodiment shown in the figures of the drawings, in which.

DETAILED DESCRIPTION

Figure 1:
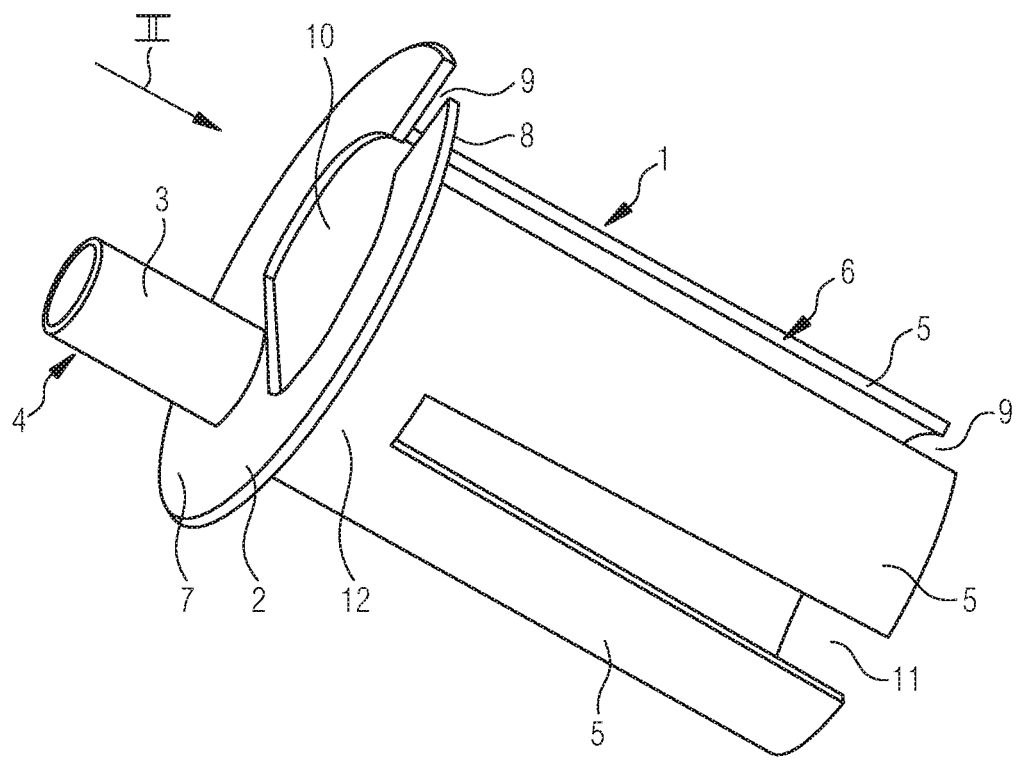
FIG. 1 is a side view of a connection adapter according to the invention.
Figure 2:
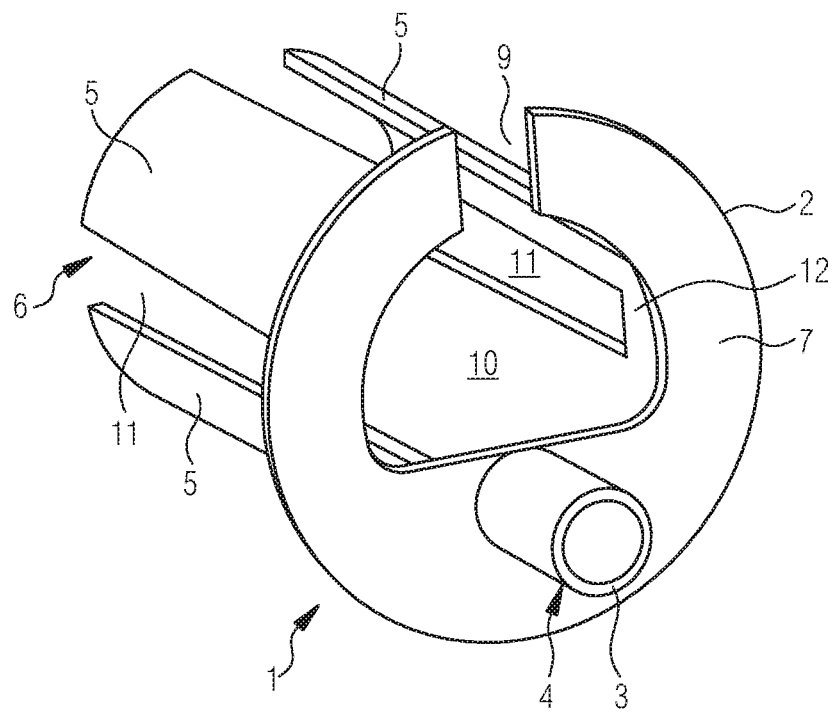
FIG. 2 is a further view of the connection adapter shown in FIG. 1 from the perspective of viewing arrow II.

The connection adapter 1 has a central flange-like disc 2, a ring sleeve 3 as the line contact 4 and a plurality of contact tabs 5 as the hose contact 6. The ring sleeve 3 projects perpendicularly from the disc face 7 of the disc 2. The counter-face 8, from which in turn the individual contact tabs 5 project perpendicularly, is remote from the disc face 7. The disc 2 is slotted by a slot 9. The slot 9 widens towards the centre of the disc 2 to form a cable through-opening 10.

A cylindrical body firstly protrudes from the counter-face 8. Longitudinal slots 11 are introduced into this cylindrical body in such a way that a ring collar 12 directly adjoining the counter-face 8 is produced, which acts as a fixed bearing for the contact tabs 5 designed in the manner of bending rod springs and projecting from the disc 2.

Figure 3:
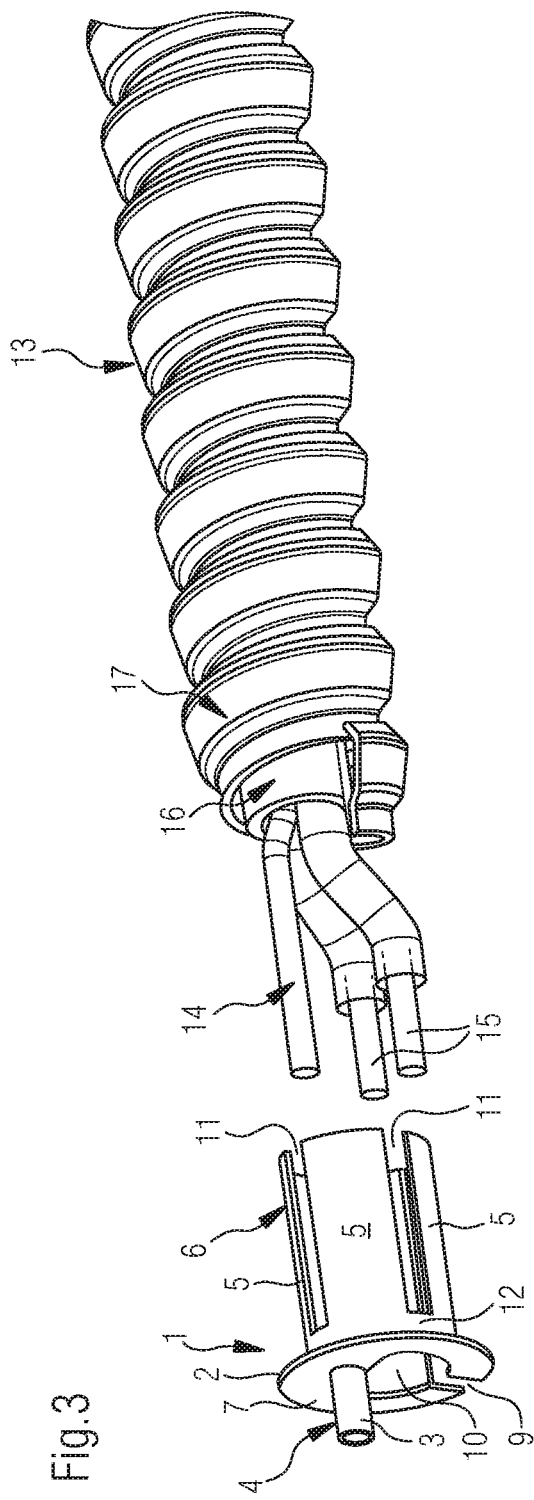
FIG. 3 is a side view of a connection adapter according to the invention and a connection line with a conduit before assembly.
Figure 4:
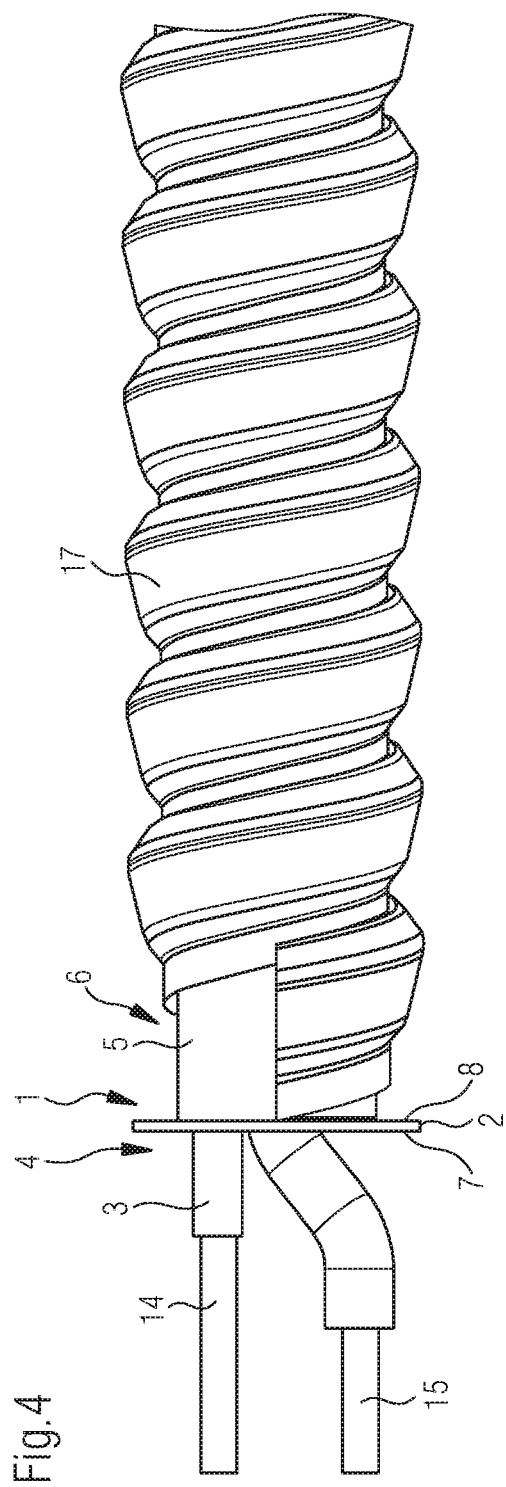
FIG. 4 shows the elements from FIG. 3 in a final assembled position thereof.
Figure 5:
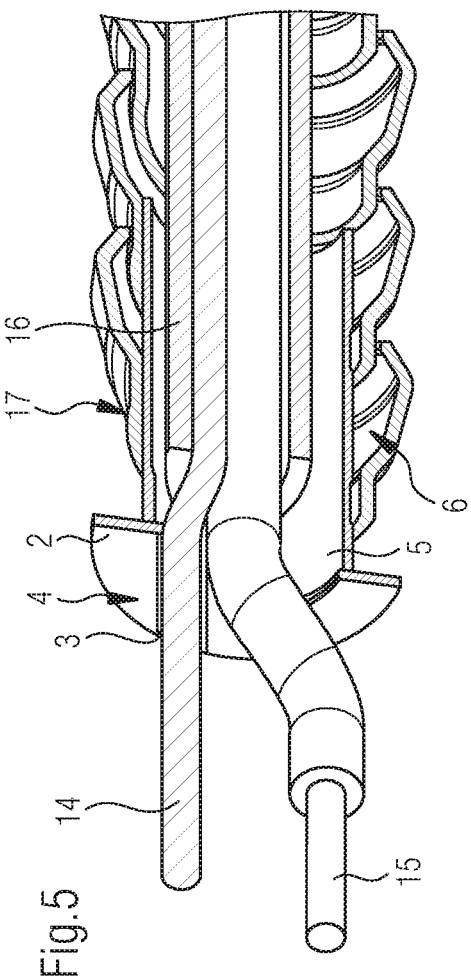
FIG. 5 is a sectional view of the connection line from FIG. 4.

The electrical line 13 depicted on the right in FIG. 3 in turn consists of the earthing line 14, the two electrical conductors 15, the insulating sheath 16 surrounding the two electrical conductors 15 and the earthing line 14, and the metal protective hose 17, which in turn sheaths the insulating sheath 16 and is also referred to as a conduit. For assembly, the earthing line 14 is firstly pushed from the counter-face 8 through the ring sleeve 3 through a line bore (not shown in the drawings). At the same time, the electrical conductors 15 are pushed through the cable through-opening 10. Furthermore, the spring-like contact tabs 5 are pressed together in such a way that the free ends thereof remote from the disc 2 slide into the gap between the insulating sheath 16 and the metal protective hose 17. As the diameter of the ring projection 12 mounting the contact tabs 5 is slightly larger than the internal diameter of the metal protective hose 17, the deflected contact tabs 5 and, if necessary, the adapter 1 pressed together radially along the slot 9, can then be inserted into the gap between the insulating sheath 16 and the metal protective hose 17 and then, under the centrifugal spring pressure thereby being produced, rest closely on the inner sheath of the metal protective hose 17. When the connection adapter 1 is completely inserted in the metal protective hose 17, the ring sleeve 3 is finally crimped with the aid of crimping pliers (not shown in the drawings) such that the ring sleeve 3 firmly clips round the earthing line 14 and thus a displacement of the earthing line 14 along the ring sleeve 3 is effectively prevented. As the connection adapter 1 is manufactured from electrically conductive material, a direct electrical connection between the earthing line 14, on the one hand, and the metal protective hose 17, on the other hand, exists by means of the contact tab 5, the disc 2 and the ring sleeve 3.

Figure 6:
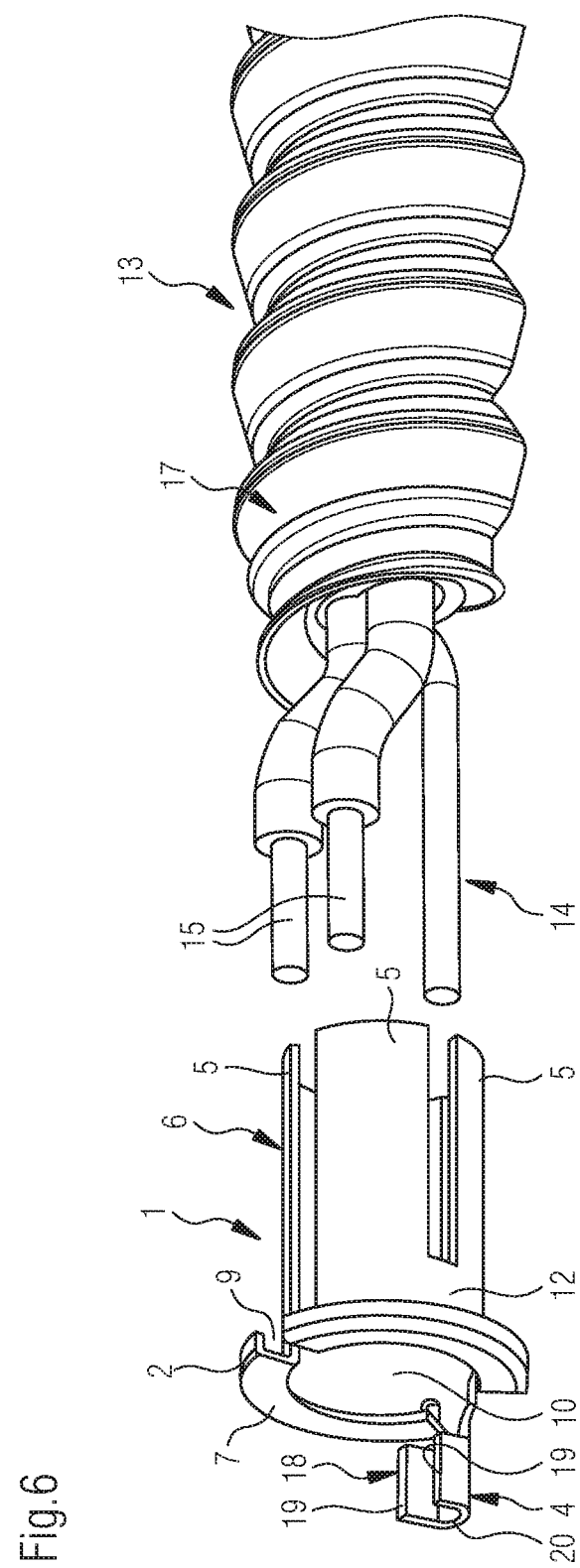
FIG. 6 is a side view of an alternative embodiment of a connection adapter according to the invention and a connection line with a conduit before assembly.

FIG. 6 finally shows an embodiment that is modified in relation to the embodiment of the connection adapter shown in FIG. 1 to FIG. 5. The view of FIG. 6 substantially corresponds to the view of FIG. 3, both the connection adapter 1 and the electrical line 13 being rotated by 180 degrees. In the view of FIG. 6, the ends of the electrical conductors 15 extend above the earthing line 14. While the ring sleeve 6 in the embodiment according to FIG. 3 is arranged in the "12 o'clock" position, in the embodiment according to FIG. 6, a receiving shoe 18 is arranged in the "6 o'clock" position. In this case, the receiving shoe 18 functionally corresponds to the ring sleeve 3. The receiving shoe 18 is designed as a ring segment-like line contact 4. The receiving shoe 18 is U-shaped in cross section, the two U-sides 19 laterally flanking the earthing line 14 in the final assembled state, while the earthing line 14 rests on the U-base 20 connecting the U-sides 19. In the final assembled state, the U-sides 19 of the receiving shoe 18 can be moved towards one another with the aid of pliers, in particular crimping pliers in the manner of clamping wings, and thus fix the earthing line 14 between them in a clamping manner.

LIST OF REFERENCE NUMERALS 1 connection adapter
2 disc
3 ring sleeve
4 line contact
5 contact tab
6 hose contact
7 disc face
8 counter-face
9 slot
10 cable through-opening
11 longitudinal slot
12 ring collar
13 electrical line
14 earthing line
15 electrical conductor
16 insulating sheath
17 protective hose
18 receiving shoe
19 U-side
20 U-base

What is claimed is:

1. A connection adapter for connecting an earthing line to a metal protective hose, comprising:
   a line contact having at least one ring segment configured to rest on an outer sheath of the earthing line, wherein the line contact comprises a closed ring that is configured to encompass the outer sheath of the earthing line;
   a hose contact having a contact tab configured to rest on an inner sheath of the metal protective hose; and
   a flange-like disc forming an opening, comprising:
      a disc face, the ring sleeve extending from the disc face;
      a counter-face remote from the disc face; and
      a contact tab that extends from the counter-face.

2. A connection adapter for connecting an earthing line to a metal protective hose, comprising:
   a line contact having at least one ring segment configured to rest on an outer sheath of the earthing line, wherein the line contact is crimped on the earthing line;
   a hose contact having a contact tab configured to rest on an inner sheath of the metal protective hose; and
   a flange-like disc forming an opening, comprising:
      a disc face, the ring sleeve extending from the disc face;
      a counter-face remote from the disc face; and
      a contact tab that extends from the counter-face.

3. The connection adapter according to claim 1, wherein the closed ring comprises a hollow cylindrical ring sleeve.

4. A connection adapter comprising:
- a disc having a first face and a second face, the disc forming a first through opening and a second through opening;
- a rigid hollow sleeve extending from the first face, a first end of the sleeve in communication with the first through opening, and configured to receive an earthing line from an electric line assembly comprising a metal protective hose, the earthing line, and at least one electric line; and
- a hose contact comprising at least two contact tabs, each contact tab comprising a first end and a second end, the first end being coupled to the second face and positioned about the second through opening, a first circle circumscribing the at least two contact tabs at the second face having a diameter less than or equal to an internal diameter of the metal protective hose, a second circle circumscribing the at least two contact tabs at the second ends of the at least two contact tabs having a diameter greater than the internal diameter of the metal protective hose.

5. The connection adapter according to claim 1, further comprising:
- a plurality of contact tabs arranged next to one another along a circular line.

6. The connection adapter according to claim 5, wherein a diameter of the circular line formed by the plurality of contact tabs arranged next to one another is greater than an internal diameter of the metal protective hose.

7. The connection adapter according to claim 6 wherein the plurality of contact tabs are configured to flex in an outward direction in response to respective forces applied to respective interior surfaces of the plurality of contact tabs.

8. The connection adapter according to claim 1 wherein the line contact is crimped on the earthing line.

9. A connection adapter for connecting an earthing line to a metal protective hose, comprising:
- a hose contact comprising at least one contact tab configured to rest on an inner sheath of the metal protective hose;
- a line contact comprising a hollow cylindrical ring sleeve configured to rest on an outer sheath of the earthing line; and
- a flange-like disc forming an opening, comprising:
  - a disc face, the line contact extending from the disc face; and
  - a counter-face remote from the disc face; and
- wherein the hose contact extends from the counter-face.

10. The connection adapter of claim 4, wherein the second ends of the at least two contact tabs are configured to be flexed inwardly such that a circle circumscribing the at least two second ends when flexed inwardly has a diameter less than the internal diameter of the metal protective hose thereby allowing the at least two contact tabs to be at least partially inserted into the metal protective hose, and, when no longer flexed inwardly, to flex outwardly to contact an interior surface of the metal protective hose.

\* \* \* \* \*